Figure 1:
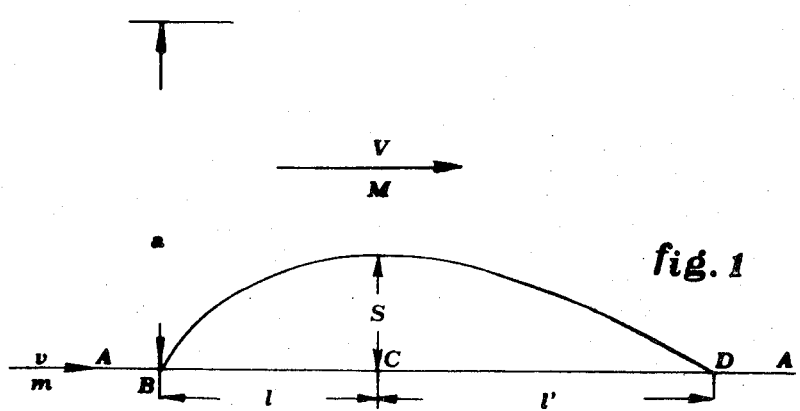

United States Patent
Meloni

[15] 3,653,632
[45] Apr. 4, 1972

[54] FLUID DYNAMIC PROFILE

[72] Inventor: Livio Meloni, Via Assisi, n. 29, Rome, Italy

[22] Filed: June 15, 1970

[21] Appl. No.: 46,194

[52] U.S. Cl. ............................................. 251/304, 251/283
[51] Int. Cl. ........................................................... F16k 1/22
[58] Field of Search ........................... 251/283, 173, 304–308

[56] References Cited

UNITED STATES PATENTS 2,271,390  1/1942  Dodson...................................251/283

*Primary Examiner*—Henry T. Klinksiek
*Attorney*—Waters, Roditi, Schwartz & Nissen

[57] ABSTRACT

Profiles of surfaces of bodies subject to relative motion in a fluid are designed on the ground of particular relationships between the elements involved when the optimum performance in the interaction between body and fluid is desired. A profile is disclosed for a rotary valve which coaxially connects two sections of a water pipeline, for closing, opening and regulating the water flow from upstream to downstream, the inner surface of suitable passageways which are evenly distributed about the axis of the rotary valve being suitably shaped.

4 Claims, 4 Drawing Figures

FLUID DYNAMIC PROFILE

The present invention relates, generally, to highly efficient fluid-dynamic profiles of rational surfaces of bodies subject to a relative motion in respect to a fluid, and more particularly to improved, rationally shaped inner surfaces of fluid passageways in a rotary valve for a water pipeline.

The term "rational surfaces" serves herein to define those surfaces the size and profile of which are calculated and designed on the ground of the most satisfactory relationships between the elements involved in the interaction with the fluid, in order to provide that fluid-dynamic profile which gives the most efficient effects.

In practice, a body may be subject to interaction with a fluid in stationary or moving conditions, so that the fluid flow in relative motion in respect to the body will be primarily affected by the body shape.

In the aircraft field the surface profile of a body has a relative motion in respect to the air, and the interaction therebetween may be referred both to the fuselage and wings, as well as the propeller or propellers, because of the interaction between these bodies and surrounding air-flows. In this field, attention must also be directed, for example, to the inner surfaces of jet engine effusers, wherein an interaction between said inner surfaces and fluid flow is provided, so that the design of proper profiles thereof will give the best airdynamic penetration effect.

In the hydrodynamic field, the surface profile of a body may be very important, for example, in the case of a submarine for the best efficiency of same, particularly when it is moving underwater; while a case which is similar to an effuser may arise, for example, when two sections of a water pipeline are connected through a regulating valve which is mounted therebetween.

The cases of a turbine, or pier of a bridge, among several other cases, may also be considered as worthy of attention.

For the few cases hereinabove briefly indicated as requiring a proper surface profile for obtaining the desired best effects when interacting with a fluid, a satisfactory solution may be found by taking into consideration particular relationships between the elements involved in such interaction.

Based on my experiments and on general principles of fluid mechanics, I have determined certain proper relationships between the most important elements involved in the interaction between fluids and the surfaces of a body when subject to a relative motion, so that calculation and design of the surface profile of a body when based on these relationships may give the best fluid-dynamic effects.

To understand better the first principles of the present invention, the main relationships as found between the elements involved in certain rational surfaces of bodies interacting with a fluid will hereinafter be reported. Examples of surface profiles are schematically shown in corresponding figures as giving the best fluid-dynamic effects when designed on the basis of said relationships; while a simple embodiment of this invention is given in detail and illustrated with the results of tests carried out thereon.

Figure 2:
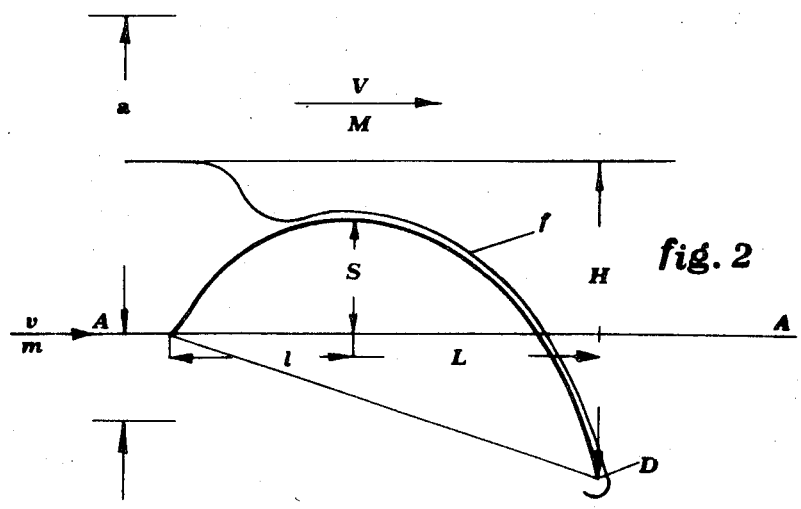
Figure 3:
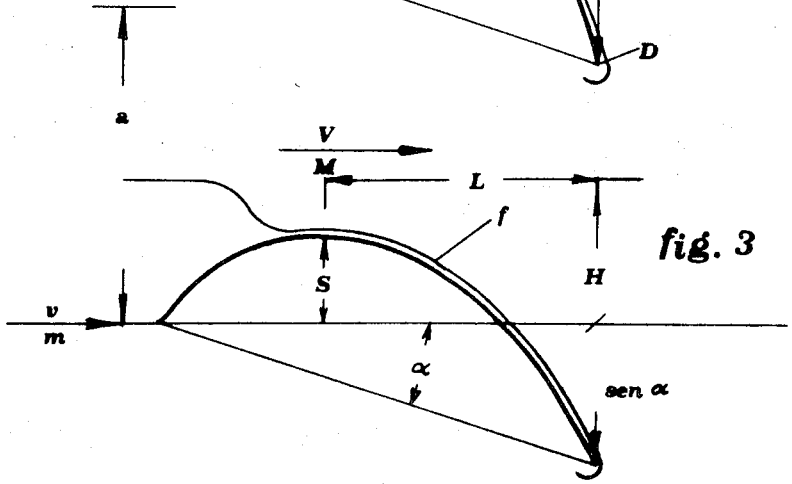
Figure 4:
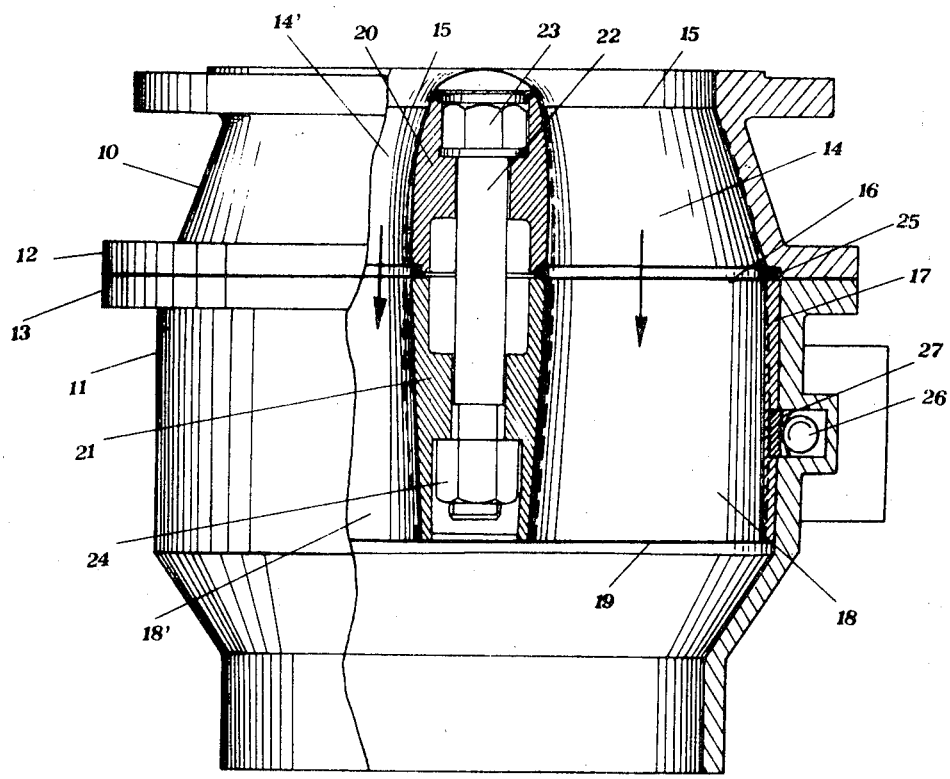

In the appended drawings:

FIG. 1 is a schematic profile of a symmetrical body subject to relative motion in a fluid, FIG. 2 is a schematic profile of a general down-wash rational surface, FIG. 3 is a schematic airfoil section particularly in reference to an aircraft wing, and FIG. 4 is a sectional view along the axis of a rotary valve, interposed between two sections of a water pipeline, showing an embodiment of a hydro-dynamic profile or the inner surfaces, in accordance with the principles of the present invention.

Referring now to the drawings, and particularly to FIG. 1, to make the illustration easier it may be assumed the straight line A—A is a path of a horizontal plane corresponding to a symmetrical axis of a surface which is moving within a fluid stream. The problem is to express the relationships between the elements involved for defining the body surface profile suitable for providing the best penetration in the fluid stream, that is obtaining the lowest drag.

It is well known that various conditions are usually considered for the fluids, each one having a corresponding coefficient, i.e. regular or laminar flow, hydraulic conditions, supersonic conditions. Hereinafter the hydraulic conditions will particularly be taken into consideration both because of being technically more important and frequent and until now considered as unapproachable in theory.

Referring again to FIG. 1, the following designations therein are considered:

l = horizontal distance between leading edge B and point C, along symmetrical straight line A—A, this point corresponding to the greatest thickness $s$, namely the nose length according to this profile.

l' = horizontal distance between point C and trailing edge D, namely the tail length according to this profile.

$a$ = pressure head at leading edge B.

$s$ = the maximum thickness of the body.

Other parameters involved are as follows:

$v$ = initial flow velocity, i.e. the velocity of undisturbed stream $m$ = pre-existent momentum $V$ = increased velocity at the point of greatest thickness $s$ $M$ = increased momentum at the point of the greatest thickness $s$ $im$ = the greatest momentum increase corresponding to the increased velocity V R = motion resistance, or drag $\rho$ = air density I have found that the following relationships may be given by the following equations:

$$l = a/2 - s/4 \quad (1)$$
$$l' = a \quad (2)$$
$$V = a/a{-}s \; v \quad (3)$$
$$im = s/a{-}s \; a \, \rho \, v^2 \quad (4)$$

while resistance R has the value $im/2$

Under hydraulic conditions, both compressible fluids as the air (to which I referred at first for giving a better idea of surface shape and also because it is the most important compressible fluid in this field) and incompressible fluids, which may in its turn be considered as represented by water, I have found that the interaction between a fluid stream and a body which has a relative motion in respect thereto, that is to say such interaction which is providing the hydrodynamic force involved, has the most satisfactory solutions when the above four equations (1) to (4) are taken into consideration for defining the profile of the surface which is directly subject to said interaction.

From these equations it is possible, for example, to deduce the coefficient $k$ of the Eiffel equation: $R = k\rho s v^2$, with a value of $k = 0.7$ both for flat plate and first Costanzi condition relating to squat bodies (having Reynolds number $r_e < 2{,}000$), quite in accordance with results which have been obtained experimentally. In that condition $V = 2v$, so that:

$m = 2 + 2)\rho s v^2$ ; $M = (1 + 2) \rho \cdot 2v^2$

By assuming the above value of $k$, namely $k = 0.7$, the efficiency $\mu$ may be expressed as follows:

$\mu = 1 - 0.7/4.84$ ; $\mu = 1 - 0.15 = 0.85$

When a general down-wash surface is considered, as schematically shown in FIG. 2, elements H and L are also involved. H indicates the lowering value of the barycenter line referred to as trailing edge D of said down-wash surface, while L indicates the distance between the projections onto horizontal line A—A of the points corresponding to the greatest thickness $s$ of the body and the trailing edge D.

Through such a down-wash surface a reaction P will be provided, the value of which is given by the following equation:

$$P = 2M(H/L)0.85 \quad (5)$$

wherein 0.85 is in turn the above value of efficiency $\mu$ by laminar flow layer $f$ which is shown in FIG. 2, that is $\mu = (1 - im/2M) = 0.85$.

On the other hand, when we have:

$V_t$ = potential downstream velocity $V_c$ = critical velocity
$n$ = contraction ratio $a/a-s$ the value of $V_c$ may be given by the following expression:

$$V_c = (V_r \times 0.85)/n \quad (6)$$

when the above efficiency value 0.85 is again assumed.

When the down-wash surface corresponds to an upper wing surface, with a profile as shown schematically in FIG. 3, it is important to keep in mind the kinetic energy of the increased stream. By using the above symbols, the kinetic energy may be expressed as follows:

$$E = \tfrac{1}{2}(a-s)\rho V^3 \quad (7)$$

If the increase of $E$ passes within thin layer $f$ still keeping its value, the increase of momentum $im$ and then resistance $R$ will be reduced up to five to six times in the case of spheres or cylinders, in accordance with Costanzi' phenomenon (beginning from a Reynolds number $R_e = 2,000$), and up to 50 times in the case of properly profiled bodies. Thus, it will be clear to those skilled in the art that more and more importance must be given to a properly designed profile for surfaces which are subject to a relative motion with respect to a fluid.

Similarly to formula (5) which is related to the case of FIG. 2, for the case of FIG. 3 there will be a lift $P'$, the formula of which is as follows:

$$P' = 2M(H/L + \text{sen } \alpha) \, 0.85 \quad (8)$$

wherein $P'$ is still less than the same value of $E$, so that by decreasing of $M$, the $H/L$ ratio must be proportionally increased. This signifies that the kinetic energy which is operating into laminar layer $f$ allows a much greater value of angle $\alpha$. Further, calculations are then not only possible, but also very much easier.

It is here desirable to add, still regarding the surface profile shown in FIG. 3, that when the total energy of thin layer $f$ is taken up by the surface friction, the lowest value of resistance will be obtained, that is to say the highest efficiency of the profile. And this relates to flaps as well as STOL (Short Take Off and Landing) features.

As it should be clear to those skilled in the art, relationships (1) to (4), to which also those of (5) to (8) may be added according to specific cases, as a great help must then be considered not only for properly calculating and designing outline of surfaces which are subject to interaction with a fluid stream in hydraulic conditions, but also profiles of inner surface of a body wherein a fluid flow is provided. As previously pointed out, in such case the inner surface profile may be related to a jet effuser along the axial section thereof; or it may be related to the inner surface profile along an axial section of a connector between two sections of a water pipeline, convergent and divergent, respectively, from upstream to downstream thereof (with a Venturi-like shape), a valve being effectively acting at the smallest cross section of the connector for closing, opening or regulating the hydraulic flow from the first to the second section with a very slight load loss.

On the basis of the Darcy-Weisbach formula concerning the load loss in a pipe, wherein the mean flow velocity has the value of $V$, the localized load loss within the valve is expressed by:

$$\Delta = k' V^2/2g \quad (9)$$

so that for reducing the load loss $\Delta$ a corresponding reduction of $k'$ will be necessary.

Now, in accordance with above teachings with reference to suitable profiles of the valve passageways to be used for regulating the fluid flow therethrough, from the upstream to the downstream section of a water pipeline, experience has clearly shown that by such use it is actually possible to considerably reduce the coefficient $k'$ of load loss $\Delta$ in comparison with other conventional valve types which were designed and carried out previously, and reaching a value equal to 2 as for conventional gate valves. Fluid flow from upstream to downstream is then to be channeled through valve passageways having a suitable profile. The use of a rotary valve is for such reason preferred, such valve being coaxial with the two connected sections of the water pipeline. Of course, empty/full ratios of the valve cross sections must be calculated for reaching the desired lowest value of the load loss.

My particular studies and experiments to perform a more suitable rotary valve resulted in notable improvements, particularly when the hydraulic flow is channeled through longitudinal passageways, that is to say substantially in the same direction of flow in the water pipeline, and evenly distributed about the valve axis. The hydrodynamic profile of such inner passageways is substantially based on the above relationships (1) to (4). On the other hand, for cross sections of the valve a proper empty/full ratio was provided as previously pointed out, as well as the general principle (Rankine) was followed according to which the motion resistance of a body in a relative motion in respect to a fluid is equal to momentum increase of such a fluid.

Assuming that:
$n$ = empty/full ratio at the smallest cross section of the passageway
$V$ = fluid flow velocity within the water pipeline
$Q$ = delivery (assumed as having a constant value)
momentum increase $im$ will be:

$$im = Q/g \times V/2 \, (n-1) \quad (10)$$

By this consideration, the load loss as in equation (9) will have the following new formula, for this specific case:

$$\Delta = (n-1)^2/2 \cdot V^2/2g \quad (11)$$

from which the following expression may be deduced for $k'$ in equation (9):

$$k' = (n-1)^2/2 \quad (12)$$

Then, if it is desired to bring the load loss of the instant rotary valve to that of a conventional gate valve, coefficient $k'$ must have a value of nearly 2. That is to say, when it is desired to obtain all the advantages from the present rotary valve, based on the profile of its flow passageways from upstream to downstream, it must be assumed $k' \cong 2$, so that equation (12) is to be expressed as follows:

$$k' = (n-1)^2/2 = 2 \quad (13)$$

and then $$(n-1) = 2 \quad (14)$$

and finally $$n = 3 \quad (15)$$

The above assumption that $k' \cong 2$ means that in practice both friction load loss and difference between theoretic hydrodynamic profile based on equations (1) to (4) and the profile actually performed may affect the shape of the valve passageways for fluid flow, which may sometimes be preferred only for reducing production costs.

Referring now to the schematic cross section of FIG. 4, which relates to a rotary valve embodying what I have pointed out above, and taking into consideration only those elements which are in relation to the selected illustrative embodiment of the present invention, between coaxial upstream and downstream sections of a water pipeline (not shown) are two coaxial pipe fittings 10 and 11 whose flanges 12 and 13 are sealably assembled through conventional means, for example bolts peripherally provided through apertures in said flanges. Fitting 10, which is connected to the upstream section of the water pipeline (not shown) has substantially longitudinal passageways 14, 14' . . . preferably four, evenly distributed about the valve axis, which are radially elongated at respective upstream inlets 15, 15' . . . and divergent toward junction plane 16 with fitting 11, this plane being, of course, normal to the valve axis.

The valve comprises a main central body 17 having an outer cylindrical surface, which is mounted within a corresponding cylindrical aperture in fitting 11 and rotable about the rotary valve axis. The central body 17 is provided with apertures 18, 18' . . . diverging from junction plane 16 downstream to end edge 19 of the body. These apertures have a peripheral outline corresponding to that of apertures 14, 14' . . . when the valve is fully opened, as shown in FIG. 4.

Central solid portions, respectively 20 in fitting 10 and 21 in valve body 17, in this embodiment are connected by a bolt 22 entering axial holes provided in these solid portions, the connection being provided so that between bolt head 23 and nut 24 the desired rotation of central body 17 of the valve is allowed to a sufficient extent for opening, closing and regulating the same between a position of complete opening of corresponding passageways 14, 18 – 14', 18' . . . for the free-flowing of water from upstream to downstream, and complete closing between 14 and 18, 14' and 18' . . . . When four evenly distributed passageways are provided in the valve, as herein assumed, both in fitting 10 and central body 17 of the valve, the rotation extent of the latter will be up to 45°.

Conventional gaskets 25 and control unit such as a worm gear 26, 27 may be used in a conventional manner both for sealing and controlling the valve.

The portion of this rotary valve which is important for the present invention concerns the inner surfaces of fluid passageways 14, 14' . . . and 18, 18' . . . the hydrodynamic profile of which is based on equations (1) to (4) in a general consideration thereof, as well as equations (9) to (15) more particularly related to said passageways, and also empty/full ratio to a value of $n \leq 3$.

The profiles of the inner surfaces calculated by said relationships are illustrated by dash lines in FIG. 4, while the actual profiles of the valve members are shown by solid lines. It should be very clear to those skilled in the art that the slight difference therebetween represents simplification of fabrication and reduction of the production costs.

On the other hand, this simplified embodiment has given satisfactory results in a set of comparison tests with a corresponding gate valve as well as a simple joint. To test said valves and joint, a vessel with 4,000 l. water was used to deliver water into another vessel, a total head of 5 m. being provided therebetween. To determine the features of a valve having a hydrodynamic profile of the passageways according to the present invention, a valve with only a passageway of such a type was interconnected between two sections of a water pipe, the inner diameter of each section being of 60 mm.

In following table the results of tests are reported:

| Inserted apparatus | Time in seconds | Velocity m/sec | Delivery l/sec. |
|---|---|---|---|
| 1) Simple joint | 72 | 0.74 | 2.10 |
| 2) Gate valve | 76 | 0.70 | 1.97 |
| 3) Valve having one passageway with hydrodynamic profile ($n=2.2$) | 74 | 0.71 | 2.02 |

From the above results, one skilled in the art may already appreciate the importance of the high value reached for delivery (2.02 l/sec) by using a hydrodynamic profile in accordance with the present invention, said value being greater than a conventional gate valve (1.97 l/sec). Calculations for such hydrodynamic profile were, of course, based on the first relationships (1) to (4), and by selecting a proper value for the empty/full ratio $n$ deduced from equations (10) to (15). It must also be added that other tests were performed in comparison with a tube having an inner Venturi profile, and the results of this latter were smaller than a conventional gate valve in regard to coefficient $k'$ of equation (12).

On the other hand, as was previously pointed out, in a passageway, the hydrodynamic profile of which is in accordance with the present invention, the friction load loss as well as the difference between theoretical and actual profile are also involved, so that the results actually obtainable when the hydrodynamic profiles in accordance with the present invention are provided, must be considered as much more satisfactory.

I claim:

1. A highly fluid-dynamic profile of a surface of a body which is immersed in a fluid and undergoes relative movement with respect thereto, said profile satisfying the following relationships $$1 = a/2 - s/4 \qquad (1)$$
$$1' = a \qquad (2)$$
$$V = a/a-s\, v \qquad (3)$$
$$im = s/a-s\, a\, \rho\, v^2 \qquad (4)$$

wherein:
 $1 =$ nose length of the body,
 $1' =$ tail length of the body,
 $a =$ pressure head at the leading edge of the body,
 $s =$ the greatest thickness of the body,
 $v =$ initial flow velocity,
 $m =$ pre-existing momentum,
 $V =$ increased velocity at the point of the greatest thickness $s$,
 $M =$ increased momentum at the point of the greatest thickness $s$,
 $im =$ the greatest momentum increase corresponding to the increased velocity $V$,
 $\rho =$ fluid density.

2. A surface profile according to claim 1 wherein said body is an airfoil.

3. A surface profile according to claim 1 wherein said surfaces are formed on inner passageways provided in a valve body inserted between two corresponding sections of a pipeline, said passageways having an empty/full ratio $n$ to provide minimum load loss in flow from upstream to downstream in said water pipeline.

4. A surface profile according to claim 3 wherein the load loss is about 2, and the empty/full ratio $n$ is equal to 3.

* * * * *